United States Patent
Yoshida

(10) Patent No.: US 10,087,508 B2
(45) Date of Patent: Oct. 2, 2018

(54) ALUMINUM ALLOY AND METHOD OF MANUFACTURING EXTRUSION USING SAME

(75) Inventor: Tomoo Yoshida, Namerikawa (JP)

(73) Assignee: Aisin Keikinzoku Co., Ltd. (JP)

( * ) Notice: Subject to any disclaimer, the term of this patent is extended or adjusted under 35 U.S.C. 154(b) by 875 days.

(21) Appl. No.: 14/118,793

(22) PCT Filed: Apr. 24, 2012

(86) PCT No.: PCT/JP2012/060949
§ 371 (c)(1),
(2), (4) Date: Nov. 19, 2013

(87) PCT Pub. No.: WO2012/165086
PCT Pub. Date: Dec. 6, 2012

(65) Prior Publication Data
US 2014/0102601 A1    Apr. 17, 2014

(30) Foreign Application Priority Data

Jun. 2, 2011 (JP) .................. 2011-124276

(51) Int. Cl.
| C22C 21/10 | (2006.01) |
| B21C 23/00 | (2006.01) |
| B21C 23/08 | (2006.01) |
| B21C 23/14 | (2006.01) |
| B60R 19/18 | (2006.01) |

(52) U.S. Cl.
CPC ............ *C22C 21/10* (2013.01); *B21C 23/002* (2013.01); *B21C 23/085* (2013.01); *B21C 23/142* (2013.01); *B60R 2019/182* (2013.01)

(58) Field of Classification Search
CPC .................................. C22F 1/053; C22C 21/10
See application file for complete search history.

(56) References Cited

U.S. PATENT DOCUMENTS

| 2007/0074791 A1 | 4/2007 | Yoshida et al. |
| 2009/0053098 A1 | 2/2009 | Yoshida et al. |
| 2011/0017366 A1 | 1/2011 | Yoshida et al. |

FOREIGN PATENT DOCUMENTS

| EP | 2141253 A1 | 1/2010 |
| GB | 1392722 A | 4/1975 |
| JP | 2-073941 A | 3/1990 |
| JP | 5-070910 A | 3/1993 |
| JP | 9-125184 A | 5/1997 |

(Continued)

OTHER PUBLICATIONS

Extended European Search Report for Application No. EP 12 79 3929 dated Oct. 9, 2014 (9 pages).

(Continued)

*Primary Examiner* — George Wyszomierski
*Assistant Examiner* — Janell C Morillo
(74) *Attorney, Agent, or Firm* — Harness, Dickey & Pierce, P.L.C.

(57) ABSTRACT

A high-strength aluminum alloy exhibiting excellent stress corrosion cracking resistance and excellent extrudability, and a method for producing an extruded shape using the same are disclosed. The aluminum alloy includes 1.6 to 2.6 mass % of Mg, 6.0 to 7.0 mass % of Zn, 0.5 mass % or less of Cu, and 0.01 to 0.05 mass % of Ti, with the balance being Al and unavoidable impurities.

1 Claim, 7 Drawing Sheets

When $40mm < a \leq 75mm$
- $b \leq 120mm$
- $3 \leq t_1 \leq 8$
- $1 \leq t_2 \leq 6$
- $1 \leq t_3 \leq 6$

(56) References Cited

FOREIGN PATENT DOCUMENTS

| | | | |
|---|---|---|---|
| JP | 2928445 | B2 | 8/1999 |
| JP | 2001-115227 | A | 4/2001 |
| JP | 2001115227 | A * | 4/2001 |
| JP | 3735407 | B2 | 1/2006 |
| JP | 3834076 | B2 | 10/2006 |
| JP | 2006-316295 | A | 11/2006 |
| JP | 2007-100157 | A | 4/2007 |
| JP | 2007-11990 | A | 5/2007 |
| JP | 2008274441 | A * | 11/2008 |
| JP | 2010-018850 | A | 1/2010 |
| JP | 4498180 | B2 | 7/2010 |
| JP | 2010159005 | A * | 7/2010 |
| JP | 2010-275611 | A | 12/2010 |
| JP | 2011-241449 | A | 12/2011 |
| WO | WO-2008-005852 | A2 | 1/2008 |
| WO | WO-2008-123184 | A1 | 10/2008 |
| WO | WO 2010049445 | A1 * | 5/2010 ............. C22C 21/10 |

OTHER PUBLICATIONS

B. Kannan et al., "Enhancing Stress Corrosion Cracking Resistance in Al—Zn—Mg—Cu—Zr Alloy Through Inhibiting Recrystallization", Engineering Fracture Mechanics, Pergamon Press, New York, vol. 77, No. 2, Jan. 1, 2010, pp. 249-256.

* cited by examiner

FIG. 1

| | No | Chemical component(%) | | | | | | | | | | | |
|---|---|---|---|---|---|---|---|---|---|---|---|---|---|
| | | Si | Fe | Cu | Mn | Mg | Cr | Zn | Zr | Mn+Cr+Zr in total | Ti | Al |
| Example | 1 | 0.06 | 0.17 | 0.25 | 0.00 | 2.01 | 0.00 | 6.69 | 0.19 | 0.19 | 0.02 | Balance |
| | 2 | 0.05 | 0.09 | 0.25 | 0.00 | 2.60 | 0.00 | 6.72 | 0.19 | 0.19 | 0.03 | Balance |
| | 3 | 0.05 | 0.17 | 0.25 | 0.20 | 1.70 | 0.00 | 6.64 | 0.19 | 0.39 | 0.02 | Balance |
| | 4 | 0.05 | 0.17 | 0.25 | 0.00 | 1.70 | 0.10 | 6.64 | 0.19 | 0.29 | 0.02 | Balance |
| | 5 | 0.06 | 0.16 | 0.20 | 0.20 | 1.59 | 0.01 | 6.39 | 0.17 | 0.38 | 0.02 | Balance |
| | 6 | 0.06 | 0.16 | 0.32 | 0.29 | 1.91 | 0.01 | 7.02 | 0.21 | 0.51 | 0.02 | Balance |
| | 7 | 0.05 | 0.18 | 0.19 | 0.18 | 1.91 | 0.00 | 7.01 | 0.16 | 0.34 | 0.02 | Balance |
| | 8 | 0.05 | 0.17 | 0.25 | 0.25 | 1.71 | 0.00 | 6.69 | 0.21 | 0.46 | 0.02 | Balance |
| | 9 | 0.05 | 0.17 | 0.25 | 0.25 | 1.71 | 0.00 | 6.69 | 0.21 | 0.46 | 0.02 | Balance |
| | 10 | 0.05 | 0.17 | 0.28 | 0.19 | 1.79 | 0.00 | 6.92 | 0.17 | 0.36 | 0.02 | Balance |
| | 11 | 0.05 | 0.16 | 0.29 | 0.19 | 1.60 | 0.00 | 6.37 | 0.17 | 0.36 | 0.02 | Balance |
| | 12 | 0.05 | 0.17 | 0.19 | 0.19 | 1.99 | 0.00 | 6.41 | 0.17 | 0.36 | 0.02 | Balance |
| | 13 | 0.05 | 0.17 | 0.20 | 0.19 | 1.78 | 0.00 | 6.01 | 0.17 | 0.36 | 0.02 | Balance |

FIG. 2

| | | Chemical component(%) | | | | | | | | | | |
|---|---|---|---|---|---|---|---|---|---|---|---|---|
| No | Si | Fe | Cu | Mn | Mg | Cr | Zn | Zr | Mn+Cr+Zr in total | Ti | Al | |
| 1 | 0.05 | 0.17 | 0.25 | 0.10 | 1.70 | 0.00 | 6.64 | 0.19 | 0.29 | 0.02 | Balance | Comparative Example |
| 2 | 0.05 | 0.09 | 0.25 | 0.20 | 1.70 | 0.00 | 6.64 | 0.19 | 0.39 | 0.02 | Balance | |
| 3 | 0.06 | 0.16 | 0.25 | 0.01 | 1.35 | 0.01 | 7.00 | 0.18 | 0.20 | 0.02 | Balance | |
| 4 | 0.05 | 0.15 | 0.41 | 0.03 | 1.58 | 0.02 | 7.23 | 0.20 | 0.25 | 0.01 | Balance | |
| 5 | 0.05 | 0.17 | 0.24 | 0.00 | 1.15 | 0.00 | 7.92 | 0.15 | 0.15 | 0.02 | Balance | |
| 6 | 0.05 | 0.18 | 0.25 | 0.00 | 1.17 | 0.00 | 8.89 | 0.15 | 0.15 | 0.02 | Balance | |
| 7 | 0.05 | 0.09 | 0.25 | 0.00 | 2.50 | 0.00 | 5.24 | 0.19 | 0.19 | 0.03 | Balance | |
| 8 | 0.05 | 0.17 | 0.25 | 0.02 | 1.22 | 0.01 | 6.71 | 0.19 | 0.22 | 0.02 | Balance | |
| 9 | 0.06 | 0.17 | 0.11 | 0.02 | 1.35 | 0.02 | 6.53 | 0.19 | 0.22 | 0.02 | Balance | |
| 10 | 0.05 | 0.16 | 0.25 | 0.02 | 1.07 | 0.01 | 5.95 | 0.11 | 0.15 | 0.01 | Balance | |
| 11 | 0.05 | 0.17 | 0.25 | 0.02 | 1.15 | 0.01 | 6.80 | 0.20 | 0.23 | 0.02 | Balance | |
| 12 | 0.06 | 0.17 | 0.25 | 0.01 | 1.05 | 0.01 | 6.40 | 0.19 | 0.21 | 0.02 | Balance | |
| 13 | 0.06 | 0.16 | 0.25 | 0.01 | 1.25 | 0.02 | 7.00 | 0.19 | 0.22 | 0.02 | Balance | |
| 14 | 0.06 | 0.16 | 0.25 | 0.02 | 1.02 | 0.01 | 6.75 | 0.20 | 0.23 | 0.02 | Balance | |
| 15 | 0.05 | 0.17 | 0.08 | 0.00 | 0.95 | 0.00 | 5.81 | 0.05 | 0.05 | 0.02 | Balance | |
| 16 | 0.05 | 0.17 | 0.42 | 0.08 | 1.73 | 0.05 | 7.50 | 0.21 | 0.34 | 0.02 | Balance | |
| 17 | 0.06 | 0.17 | 0.25 | 0.02 | 1.35 | 0.01 | 6.53 | 0.19 | 0.22 | 0.02 | Balance | |
| 18 | 0.06 | 0.17 | 0.25 | 0.02 | 1.35 | 0.01 | 6.53 | 0.19 | 0.22 | 0.02 | Balance | |
| 19 | 0.06 | 0.17 | 0.25 | 0.02 | 1.35 | 0.01 | 6.53 | 0.19 | 0.22 | 0.02 | Balance | |
| 20 | 0.15 | 0.29 | 0.25 | 0.02 | 1.32 | 0.01 | 6.47 | 0.19 | 0.22 | 0.02 | Balance | |
| 21 | 0.06 | 0.17 | 0.25 | 0.00 | 1.38 | 0.00 | 6.49 | 0.05 | 0.05 | 0.02 | Balance | |
| 22 | 0.06 | 0.17 | 0.25 | 0.02 | 1.35 | 0.01 | 6.53 | 0.19 | 0.22 | 0.02 | Balance | |
| 23 | 0.06 | 0.17 | 0.25 | 0.02 | 1.35 | 0.01 | 6.53 | 0.19 | 0.22 | 0.02 | Balance | |
| 24 | 0.06 | 0.17 | 0.25 | 0.02 | 1.35 | 0.01 | 6.53 | 0.19 | 0.22 | 0.02 | Balance | |
| 25 | 0.05 | 0.17 | 0.25 | 0.01 | 1.80 | 0.01 | 7.50 | 0.19 | 0.21 | 0.02 | Balance | |
| 26 | 0.06 | 0.17 | 0.25 | 0.01 | 1.01 | 0.01 | 7.19 | 0.19 | 0.21 | 0.02 | Balance | |
| 27 | 0.05 | 0.17 | 0.43 | 0.01 | 1.15 | 0.01 | 6.71 | 0.01 | 0.03 | 0.02 | Balance | |
| 28 | 0.06 | 0.18 | 0.01 | 0.01 | 1.16 | 0.01 | 6.74 | 0.10 | 0.12 | 0.02 | Balance | |

FIG. 3

| | | No | HOMO temperature | Extrusion conditions | | | Mechanical properties | | | | SCC | | Microstructure | | Extrudability | Overall evaluation |
|---|---|---|---|---|---|---|---|---|---|---|---|---|---|---|---|---|
| | | | | Billet temperature | Temperature of extruded shape | Cooling rate after extrusion | $\sigma_B$ (N/mm²) | $\sigma_{0.2}$ (N/mm²) | Evaluation | $\delta$ (%) | cyc | Evaluation | Recrystallization ratio (%) | Evaluation | Surface properties | |
| | | | 500~560 | 400°C or more | 500 to 585°C | 50 to 500 °C/min or less | | 470 or more | | | 720 or more | | 15 or less | | — | |
| Example | | 1 | 520 | 510 | 531 | 62 | 529 | 487 | ○ | 16 | 756 | ○ | 2 | ○ | Normal | ○ |
| | | 2 | 520 | 510 | 529 | 139 | 512 | 482 | ○ | 15 | 882 | ○ | 2 | ○ | Normal | ○ |
| | | 3 | 500 | 400 | 533 | 141 | 535 | 503 | ○ | 14 | 882 | ○ | 2 | ○ | Normal | ○ |
| | | 4 | 500 | 400 | 531 | 141 | 536 | 497 | ○ | 14 | 962 | ○ | 1 | ○ | Normal | ○ |
| | | 5 | 500 | 400 | 527 | 140 | 511 | 574 | ○ | 15 | 776 | ○ | 5 | ○ | Normal | ○ |
| | | 6 | 510 | 400 | 531 | 140 | 567 | 516 | ○ | 14 | 821 | ○ | 1 | ○ | Normal | ○ |
| | | 7 | 500 | 400 | 530 | 139 | 561 | 511 | ○ | 15 | 735 | ○ | 7 | ○ | Normal | ○ |
| | | 8 | 500 | 400 | 525 | 141 | 537 | 503 | ○ | 14 | 910 | ○ | 1 | ○ | Normal | ○ |
| | | 9 | 540 | 400 | 531 | 137 | 536 | 505 | ○ | 14 | 886 | ○ | 2 | ○ | Normal | ○ |
| | | 10 | 500 | 400 | 527 | 136 | 544 | 515 | ○ | 14 | 925 | ○ | 4 | ○ | Normal | ○ |
| | | 11 | 500 | 400 | 532 | 139 | 512 | 479 | ○ | 15 | 879 | ○ | 2 | ○ | Normal | ○ |
| | | 12 | 500 | 400 | 530 | 140 | 519 | 488 | ○ | 14 | 931 | ○ | 5 | ○ | Normal | ○ |
| | | 13 | 500 | 400 | 529 | 142 | 507 | 476 | ○ | 14 | 870 | ○ | 1 | ○ | Normal | ○ |

FIG. 4

| | | Extrusion conditions | | | | Mechanical properties | | | | | SCC | | Microstructure | | Extrudability | Overall evaluation |
|---|---|---|---|---|---|---|---|---|---|---|---|---|---|---|---|---|
| | HOMO temperature | Billet temperature | Temperature of extruded shape | Cooling rate after extrusion | | $\sigma_B$ (N/mm²) | $\sigma_{0.2}$ (N/mm²) | | Evaluation | δ (%) | cyc | Evaluation | Recrystallization ratio (%) | Evaluation | Surface properties | |
| No | 500 ~ 560 | 400°C or more | 500 to 585°C | 50 to 500 °C/min or less | | | 470 or more | | | | 720 or more | | 15 or less | | — | |
| 1 | 565 | 400 | 537 | 140 | | 535 | 497 | | ○ | 14 | 36 | × | 32 | × | Normal | × |
| 2 | 565 | 400 | 533 | 141 | | 532 | 495 | | ○ | 14 | 40 | × | 24 | × | Normal | × |
| 3 | 520 | 510 | 529 | 62 | | 490 | 451 | | × | 17 | 1440 or more | ○ | 2 | ○ | Normal | × |
| 4 | 520 | 510 | 534 | 62 | | 503 | 473 | | ○ | 16 | 693 | × | 1 | ○ | Normal | × |
| 5 | 520 | 510 | 541 | 68 | | 506 | 466 | | × | 16 | 63 | × | 21 | × | Normal | × |
| 6 | 520 | 510 | 540 | 62 | | 529 | 479 | | ○ | 16 | 42 | × | 19 | × | Normal | × |
| 7 | 520 | 510 | 532 | 137 | | 486 | 449 | | × | 16 | 1008 | ○ | 2 | ○ | Normal | × |
| 8 | 520 | 510 | 535 | 69 | | 463 | 421 | | × | 17 | 1440 or more | ○ | 2 | ○ | Normal | × |
| 9 | 520 | 510 | 536 | 31 | | 454 | 419 | | × | 18 | 1440 or more | ○ | 2 | ○ | Normal | × |
| 10 | 520 | 510 | 528 | 62 | | 418 | 371 | | × | 14 | 819 | ○ | 18 | × | Normal | × |
| 11 | 520 | 510 | 533 | 62 | | 449 | 413 | | × | 16 | 1440 or more | ○ | 2 | ○ | Normal | × |
| 12 | 520 | 510 | 539 | 62 | | 414 | 374 | | × | 16 | 1440 or more | ○ | 2 | ○ | Normal | × |
| 13 | 520 | 510 | 531 | 62 | | 477 | 437 | | × | 17 | 1440 or more | ○ | 2 | ○ | Normal | × |
| 14 | 520 | 510 | 534 | 62 | | 427 | 391 | | × | 17 | 1440 or more | ○ | 2 | ○ | Normal | × |
| 15 | 520 | 510 | 533 | 63 | | 386 | 341 | | × | 13 | 441 | × | 46 | × | Normal | × |
| 16 | 520 | 510 | 532 | 142 | | 531 | 492 | | ○ | 14 | 84 | × | 2 | ○ | Normal | × |
| 17 | 480 | 510 | 530 | 62 | | 458 | 412 | | × | 18 | 1440 or more | ○ | 2 | ○ | Normal | × |
| 18 | 565 | | | | Local melting occurred during homogenization | | | | | | | | | | | × |
| 19 | 520 | 510 | 529 | 25 | | 409 | 368 | | × | 15 | 1440 or more | ○ | 3 | ○ | Normal | × |
| 20 | 520 | 510 | 530 | 62 | | 436 | 391 | | × | 12 | 1440 or more | ○ | 3 | ○ | Normal | × |
| 21 | 520 | 510 | 539 | 62 | | 438 | 410 | | × | 11 | 84 | × | 100 | × | Normal | × |
| 22 | 520 | 510 | 537 | 750 | | 476 | 441 | | × | 16 | 252 | × | 3 | ○ | Normal | × |
| 23 | 520 | 530 | 585 | 62 | | — | — | | — | — | — | — | — | — | Tear | × |
| 24 | 520 | 540 | 590 | 62 | | — | — | | — | — | — | — | — | — | Pickup | × |
| 25 | 520 | 510 | 531 | 62 | | 572 | 542 | | ○ | 17 | 252 | × | 2 | ○ | Normal | × |
| 26 | 520 | 510 | 536 | 62 | | 443 | 402 | | × | 17 | 504 | × | 2 | ○ | Normal | × |
| 27 | 520 | 510 | 532 | 62 | | 445 | 403 | | × | 17 | 252 | × | 100 | × | Normal | × |
| 28 | 520 | 510 | 538 | 62 | | 439 | 404 | | × | 17 | 504 | × | 17 | × | Normal | × |

Comparative Example

When 40mm<a≦75mm
- b≦120mm
- 3≦t₁≦8
- 1≦t₂≦6
- 1≦t₃≦6

When $a \leqq 40$mm
- $b \leqq 140$mm
- $3 \leqq t_1 \leqq 8$
- $1 \leqq t_2 \leqq 6$
- $1 \leqq t_3 \leqq 6$

- a≦170mm
- b≦140mm
- 1≦t₁≦8
- 1≦t₂≦8

ALUMINUM ALLOY AND METHOD OF MANUFACTURING EXTRUSION USING SAME

CROSS-REFERENCE TO RELATED APPLICATIONS

This application is a U.S. National Stage Application of International Application No. PCT/JP2012/060949 filed on Apr. 24, 2012, and published in Japanese as WO 2012/165086 A1 on Dec. 6, 2012. This application claims priority to Japanese Application No. 2011-124276 filed on Jun. 2, 2011. The disclosures of the above applications are incorporated herein by reference.

TECHNICAL FIELD

The invention relates to a high-strength aluminum alloy exhibiting excellent stress corrosion cracking resistance and ensuring high productivity, and a method for producing an extruded shape using the same.

BACKGROUND ART

A high-strength aluminum material has been strongly desired for a vehicular structural member (e.g., side member) and a vehicular energy-absorbing member (e.g., bumper reinforcement and side door beam) in order to reduce fuel consumption through a reduction in weight.

However, when the content of Mg, Zn, Cu, and the like in a JIS 7000 series aluminum alloy is increased in order to improve the strength of the material, a decrease in toughness that has a trade-off relationship with the strength may occur. Moreover, since $MgZn_2$ precipitates having a potential lower than that of aluminum may be produced at the crystal grain boundaries, a deterioration in stress corrosion cracking resistance and a significant deterioration in extrudability may occur.

The applicant of the present application proposed a high-strength aluminum alloy obtained by quenching an aluminum alloy that includes 1.5 to 2.0% of Mg, 7.0 to 9.0% of Zn, 0.2 to 0.4% of Cu, and the like after extrusion at a cooling rate of 1000° C./min or more (see Japanese Patent No. 3735407).

The aluminum material disclosed in Japanese Patent No. 3735407 exhibits high strength and excellent toughness. However, it is necessary to perform water quenching in order to achieve a cooling rate of 1000° C./min or more.

Since the extruded shape may become brittle due to incorporation of hydrogen during water quenching, there has been room for a further improvement in stress corrosion cracking resistance.

As an aluminum alloy that is characterized by the content of Mg, Zn, and Cu, Japanese Patent No. 3834076 discloses an aluminum alloy that is used to produce an automotive constituent member, and includes 0.9 to 1.3% of Mg, 8.0 to 10.0% of Zn, and 0.45 to 0.55% of Cu, and Japanese Patent No. 2928445 discloses a high-strength aluminum alloy that includes 1.0 to 1.5% of Mg, 5.0 to 7.0% of Zn, and 0.1 to 0.3% of Cu. However, since the Mg content in these aluminum alloys is 1.3% or less or 1.5% or less, it is difficult to obtain a 0.2% proof stress of 470 MPa or more.

In Japanese Patent No. 3834076, since the Zn content is as high as 8% or more, a deterioration in stress corrosion cracking resistance may occur.

Japanese Patent No. 4498180 discloses an aluminum alloy that includes 1.9 to 2.6% of Mg, 5.7 to 6.7% of Zn, and 2.0 to 2.6% of Cu. However, since the Cu content is 2.0% or more, it is expected that the extrudability significantly deteriorates. Therefore, the aluminum alloy disclosed in Japanese Patent No. 4498180 is not suitable for producing an extruded shape having a hollow cross-sectional shape (e.g., bumper reinforcement).

SUMMARY OF THE INVENTION

Technical Problem

An object of the invention is to provide a high-strength aluminum alloy exhibiting excellent stress corrosion cracking resistance and excellent extrudability, and a method for producing an extruded shape using the same.

Solution to Problem

According to one aspect of the invention, an aluminum alloy includes 1.6 to 2.6 mass % of Mg, 6.0 to 7.0 mass % of Zn, 0.5 mass % or less of Cu, and 0.01 to 0.05 mass % of Ti, with the balance being Al and unavoidable impurities. Note that the unit "mass %" may be hereinafter referred to as "%".

The aluminum alloy that includes the above chemical components ensures that a high-strength extruded shape that exhibits a 0.2% proof stress of 470 MPa or more is obtained by performing air quenching without performing water quenching immediately after extrusion, or performing heating and water quenching after extrusion.

Since water quenching is unnecessary, incorporation of hydrogen that may cause stress corrosion cracking does not occur, and the stress corrosion cracking resistance is improved.

The aluminum alloy may further include 0.15 to 0.6% of one element or two or more elements in total among Mn, Cr, and Zr in order to suppress formation of recrystallized grains on the surface of the extruded shape during extrusion.

The stress corrosion cracking resistance is further improved by thus suppressing formation of recrystallized grains on the surface of the extruded shape.

According to another aspect of the invention, a method for producing an aluminum alloy extruded shape includes casting a billet using the aluminum alloy, homogenizing the billet at 500 to 560° C., and extruding the homogenized billet to obtain an extruded shape, the extruded shape being cooled by fan cooling at a cooling rate of 50 to 500° C./min immediately after the extrusion. According to the above configuration, the stress corrosion cracking resistance can be improved while ensuring high strength since water quenching is unnecessary.

The reasons for selection of the chemical components (mass %) and the production conditions are described below.

If the Mg content is less than 1.6%, it may be difficult to achieve a high strength necessary for achieving a reduction in weight of the resulting product. If the Mg content exceeds 2.6%, a deterioration in extrudability may occur.

Therefore, the Mg content is set to 1.6 to 2.6%.

If the Zn content is less than 6.0%, it may be difficult to achieve a high strength that is necessary for achieving a reduction in weight of the resulting product. If the Zn content exceeds 7.0%, a deterioration in stress corrosion cracking resistance may occur.

Therefore, the Zn content is set to 6.0 to 7.0%.

Cu contributes to an increase in strength. However, if the Cu content exceeds 0.5%, a deterioration in extrudability may occur.

Therefore, the Cu content is set to 0.5% or less. The Cu content is preferably set to 0.1 to 0.5% from the viewpoint of obtaining the effect of addition of Cu.

The Cu content is more preferably set to 0.15 to 0.4%.

Mn, Cr, and Zr suppress formation of coarse recrystallized grains on the surface of the extruded shape, and suppress propagation of cracks, thereby contributing to an improvement in stress corrosion cracking resistance. If the total content of Mn, Cr, and Zr is less than 0.15%, the above effects may not be obtained. If the total content of Mn, Cr, and Zr exceeds 0.6%, the quench sensitivity may become high, and the desired strength may not be obtained.

When adding only one element among Mn, Cr, and Zr, the content of that element is preferably set to 0.10 to 0.30%.

Although Zr can sufficiently suppress formation of recrystallized grains when added alone, it is preferable to add Zr together with Mn and/or Cr in order to stabilize the fiber structure.

Ti refines the crystal grains when casting a molten metal of the aluminum alloy into a billet. Ti is normally added within the range of 0.01 to 0.05%.

Fe and Si are generally mixed as impurities during aluminum refinement and casting.

A 7000 series high-strength aluminum alloy may show a deterioration in toughness when the amount of Fe and Si mixed therein is large. The Fe content is set to 0.3% or less, and preferably 0.2% or less.

The Si content is preferably set to 0.1% or less.

It is preferable to limit the total content of impurities excluding Fe and Si to 0.1% or less.

The billet homogenization conditions and the extrusion conditions are described below.

If the billet is homogenized at a temperature of less than 500° C., the solute elements may not be sufficiently dissolved, and the desired strength may not be obtained. If the billet is homogenized at a temperature of more than 560° C., the billet may be locally melted. Even if the billet is locally melted to only a small extent, and can be extruded, the amount of precipitates produced during homogenization is small, and recrystallization of the extruded shape may not be suppressed. As a result, a deterioration in stress corrosion cracking resistance may occur.

Therefore, the billet homogenization temperature is set to 500 to 560° C.

If the billet is not heated at a temperature of 400° C. or more during extrusion, the temperature of the extruded shape may be less than 500° C., and a supersaturated solid solution may not be formed by fan press quenching after extrusion. As a result, the desired strength may not be obtained.

If the temperature of the extruded shape exceeds 585° C., defects (e.g., pickup or tearing) may occur on the surface of the extruded shape.

Therefore, it is preferable to set the billet preheating temperature to 400° C. or more, and control the temperature of the extruded shape immediately after extrusion to 500 to 585° C.

If the cooling rate after extrusion is less than 50° C./min, the desired strength may not be obtained. It is difficult to achieve a cooling rate of 500° C./min or more by fan cooling due to an insufficient cooling capability. If a cooling rate of 500° C./min or more is achieved by water cooling (die edge T6) immediately after extrusion, the material may become brittle due to incorporation of hydrogen, and a deterioration in stress corrosion cracking resistance may occur.

Therefore, it is preferable to control the cooling rate to 50 to 500° C./min by means of fan cooling without using water cooling.

Advantageous Effects of the Invention

The aluminum alloy according to the aspect of the invention ensures that a high-strength extruded shape that exhibits a proof stress of 470 MPa or more is obtained by fan cooling without performing water quenching after extrusion as a result of optimizing the combination of the Mg content, the Zn content, and the Cu content, and exhibits excellent extrudability as a result of limiting the Cu content to 0.5% or less.

Therefore, it is possible to produce an extruded shape having a solid cross section (see FIG. 7) and an extruded shape having a hollow cross section (triple-hollow cross section) (see FIGS. 5 and 6).

Since high strength can be obtained without performing water quenching, it is possible to prevent a deterioration in stress corrosion cracking resistance due to incorporation of hydrogen.

BRIEF DESCRIPTION OF DRAWINGS

FIG. 1 shows the chemical components of the aluminum alloys of the examples.

FIG. 2 shows the chemical components of the aluminum alloys of the comparative examples.

FIG. 3 shows the extrusion conditions and the evaluation results when using the aluminum alloys of the examples.

FIG. 4 shows the extrusion conditions and the evaluation results when using the aluminum alloys of the comparative examples.

DESCRIPTION OF EMBODIMENTS

A molten metal of each aluminum alloy shown in FIG. 1 (Examples 1 to 13) and a molten metal of each aluminum alloy shown in FIG. 2 (Comparative Examples 1 to 28) were prepared, and cast into a billet.

Note that the content (mass %) of each component shown in FIGS. 1 and 2 indicates the analytical value after casting.

Each cast billet (diameter: 8 inches) was extruded.

FIGS. 3 and 4 show the billet homogenization temperature (HOMO temperature), the extrusion conditions, and the evaluation results.

FIGS. 3 and 4 show the optimum ranges of the HOMO temperature and the extrusion conditions, and each data indicates the measured value.

In FIGS. 3 and 4, the billet temperature refers to the billet preheating temperature before extrusion, and the temperature of the extruded shape refers to the surface temperature of the extruded shape measured immediately after extrusion.

The cooling rate after extrusion refers to the cooling rate until the temperature of the extruded shape reached 200° C. or less when air was blown against the extruded shape using a fan immediately after extrusion.

SCC refers to the stress corrosion cracking resistance. The stress corrosion cracking resistance was evaluated as described below.

Specifically, an accelerated test was performed by immersing a sample (to which a stress equal to 80% of the proof stress was applied) in a 3.5% NaCl aqueous solution at 25° C. for 10 minutes, and allowing the sample to dry at a temperature of 25° C. (room temperature) and a humidity of 40% for 50 minutes (=1 cycle). When stress corrosion cracking was not observed after 720 cycles, it was determined that the sample had stress corrosion cracking resistance sufficient for a structural material (e.g., bumper reinforcement).

In FIGS. 3 and 4, $\sigma_B$ refers to tensile strength, $\sigma_{0.2}$ refers to proof stress, and δ refers to elongation. These mechanical properties were measured using a JIS Z 2241 No. 5 specimen that was cut from the extruded shape.

The recrystallization ratio in the microstructure was determined by observing the cross section orthogonal to the extrusion direction using a microscope, and calculating the area ratio of the recrystallization area.

Figure 5:
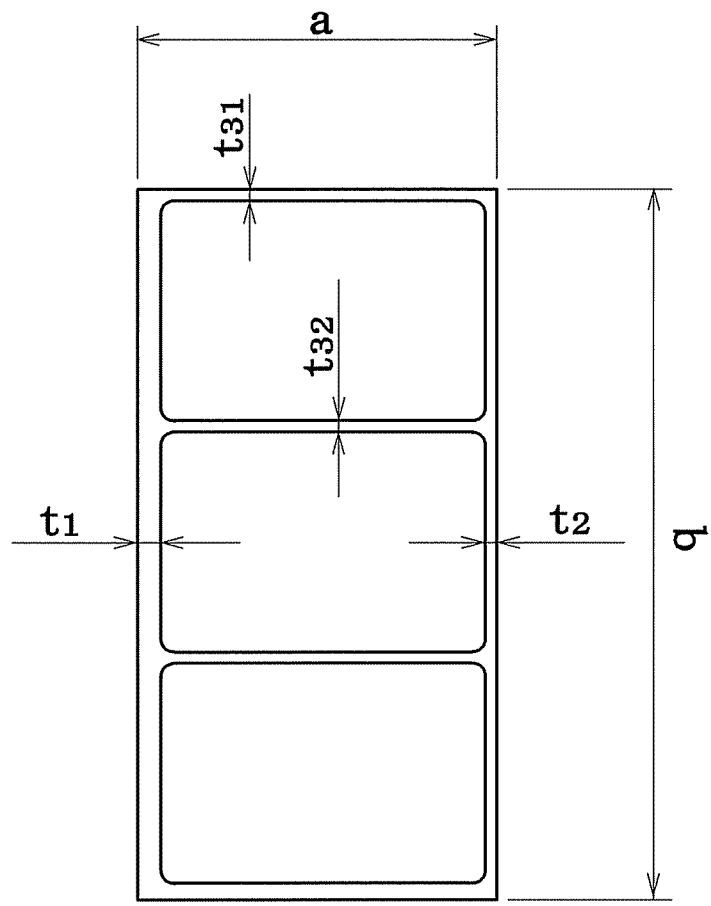
FIG. 5 illustrates an example of the cross-sectional shape of an extruded shape.
Figure 6:
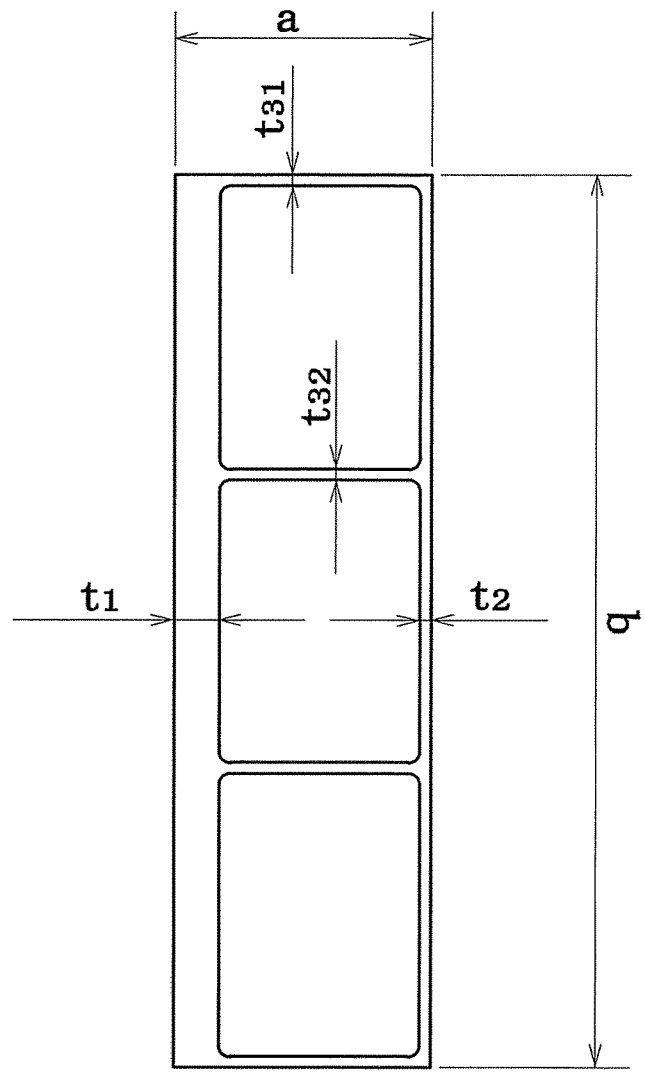
FIG. 6 illustrates an example of the cross-sectional shape of an extruded shape.
Figure 7:
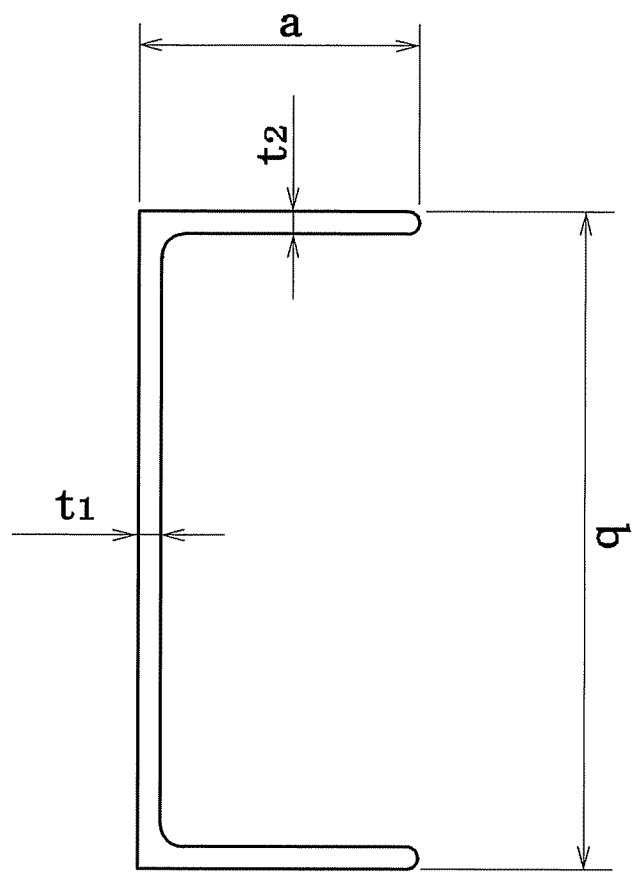
FIG. 7 illustrates an example of the cross-sectional shape of an extruded shape.

The extrudability was determined to be normal when a surface defect having a depth of 0.5 mm or more was not observed when an extruded shape having the cross-sectional shape illustrated in FIGS. 5 to 7 was extruded, and the presence or absence of a surface defect (tearing or pickup) having a depth of 0.5 mm or more was evaluated.

Discussion

In Examples 1 to 13, a proof stress of 470 MPa or more that is necessary for achieving a reduction in weight of a bumper reinforcement and the like was obtained, and excellent stress corrosion cracking resistance was achieved.

In Comparative Examples 1 and 2 in which the HOMO temperature was more than 560° C., the billet was locally melted to only a small extent, and could be extruded. However, since the amount of precipitates produced during homogenization was small, and recrystallization of the extruded shape could not be suppressed, the stress corrosion cracking resistance deteriorated.

In Comparative Examples 3, 5, 8, 10 to 15, and 20, since the Mg content was less than 1.6%, a proof stress of 470 MPa or more could not be obtained.

In Comparative Examples 16 and 25, since the Zn content was more than 7.0%, the stress corrosion cracking resistance deteriorated.

In Comparative Examples 4 and 6 in which the Mg content was less than 1.6%, and the Zn content was more than 7.0%, the desired strength was obtained, but the stress corrosion cracking resistance deteriorated.

In Comparative Example 7, since the Zn content was less than 6.0%, the desired strength could not be obtained.

In Comparative Example 9, since the cooling rate after extrusion was less than 50° C./min, the desired strength could not be obtained.

In Comparative Examples 17 and 18 in which the HOMO temperature did not fall within the optimum range, the desired strength could not be obtained when the HOMO temperature was lower than the optimum range, and the billet was locally melted, and could not be extruded when the HOMO temperature was higher than the optimum range.

In Comparative Example 19, since the Mg content was less than 1.6%, and the cooling rate after extrusion was less than 50° C./min, the desired strength could not be obtained.

In Comparative Example 21, since the Mg content was less than 1.6%, the desired strength could not be obtained. Moreover, since the total content of Mn, Cr, and Zr was less than 0.15%, recrystallization of the extruded shape could not be suppressed, and the stress corrosion cracking resistance deteriorated.

In Comparative Example 22, since the Mg content was less than 1.6%, the desired strength could not be obtained. Moreover, since water cooling was performed after extrusion, the cooling rate exceeded 500° C./min, and the material became brittle due to incorporation of hydrogen. As a result, the stress corrosion cracking resistance deteriorated.

In Comparative Examples 23 and 24, since the temperature of the extruded shape was higher than 585° C., pickup or tear occurred on the surface of the extruded profile.

In Comparative Example 26, since the Mg content was less than 1.6%, the desired strength could not be obtained. Moreover, since the Zn content was more than 7.0%, sufficient stress corrosion cracking resistance could not be obtained.

In Comparative Examples 27 and 28, since the Mg content was less than 1.6%, the desired strength could not be obtained. Moreover, since the total content of Mn, Cr, and Zn was less than 0.15%, recrystallization of the extruded shape could not be suppressed, and the stress corrosion cracking resistance deteriorated.

The aluminum alloy according to the embodiments of the invention exhibits excellent extrudability, and makes it possible to produce an extruded shape having the cross-sectional shape illustrated in FIGS. 5 to 7.

FIG. 5 illustrates an example of an extruded shape having a triple-hollow cross-sectional shape that is used for a bumper reinforcement and the like. When the dimension a is more than 40 mm and 75 mm or less, and the dimension b is 120 mm or less, it is possible to produce an extruded shape wherein $3 \leq t_1 \leq 8$, $1 \leq t_2 \leq 6$, $1 \leq t_3(t_{31}, t_{32}, \ldots) \leq 6$.

The extrudable dimensional range is similarly shown in FIGS. 6 and 7.

INDUSTRIAL APPLICABILITY

A high-strength extruded shape exhibiting excellent stress corrosion cracking resistance can be obtained using the aluminum alloy according to the embodiments of the invention. The extruded shape may be applied to a vehicular structural member and the like.

The invention claimed is:

1. A method for producing an aluminum alloy extruded shape comprising:
   casting a billet using an aluminum alloy consisting of 1.6 to 2.6 mass % of Mg, 6.0 to 7.0 mass % of Zn, 0.15 to 0.4 mass % of Cu, 0.01 to 0.05 mass % of Ti, 0.10 to 0.30 mass % of Zr and 0.10 to 0.3 mass % of Mn, the total of Zr and Mn being 0.34 to 0.6 mass %, with the balance being Al and unavoidable impurities;
   homogenizing the billet at 500 to 560° C.;
   preheating the billet to 400° C. or more;
   extruding the homogenized billet to obtain an extruded shape having a temperature between 500 and 585° C., the extruded shape being cooled at a cooling rate of 50 to 500° C./min immediately after the extrusion so as to obtain the extruded shape having a recrystallization ratio of 7% or less and a 0.2% proof stress of 470 MPa or more; and
   performing one cycle of an accelerated test that includes immersing a sample to which a stress equal to 80% of the proof stress is applied in a 3.5% NaCl aqueous solution at 25° C. for 10 minutes, and allowing the sample to air-dry at a room temperature of 25° C. and a humidity of 40% for 50 minutes, wherein the aluminum alloy extruded shape causes no stress corrosion cracking after 720 cycles.

* * * * *